July 7, 1964
B. N. TORELL
3,139,727
FUEL CONTROL FOR JET ENGINES
Filed March 3, 1955
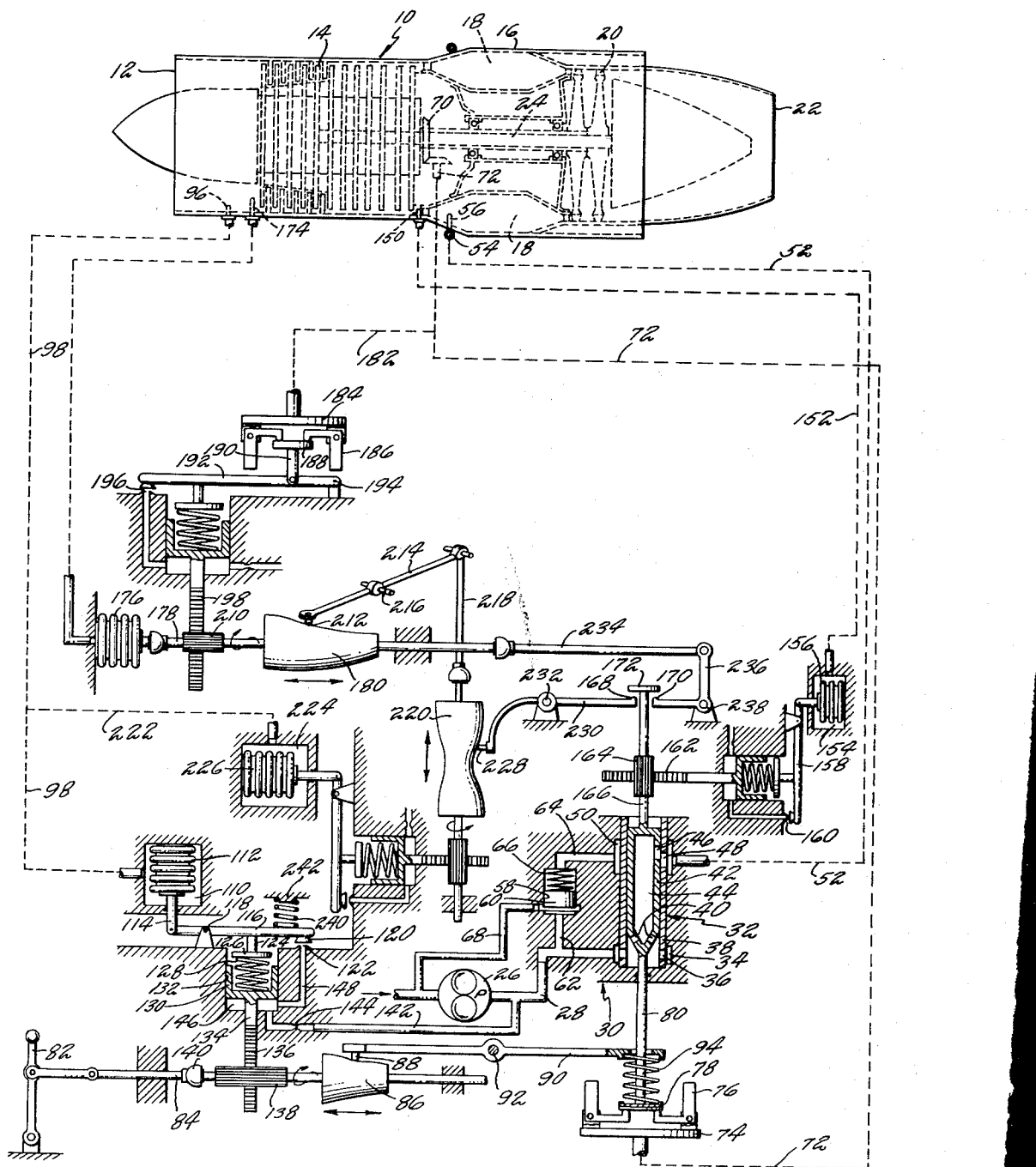
INVENTOR
BRUCE N. TORELL
BY *Russell M. Lipes Jr.*
ATTORNEY 3,139,727
FUEL CONTROL FOR JET ENGINES
Bruce N. Torell, Wethersfield, Conn., assignor to United Aircraft Corporation, East Hartford, Conn., a corporation of Delaware
Filed Mar. 3, 1955, Ser. No. 491,824
12 Claims. (Cl. 60—39.28)

This invention relates to fuel controls, more particularly to an improved fuel control for gas turbine power plants.

In the fuel control with which this invention is intended to be used, fuel-air ratio is controlled during acceleration by controlling the value of fuel flow per p.s.i. compressor discharge pressure. In order to maintain the desired turbine inlet temperature during acceleration, at any given power plant speed, it is only necessary to vary the fuel flow per unit discharge pressure as a function of compressor inlet temperature. As Reynolds number varies, however, the limit of turbine inlet temperature that must be observed to avoid compressor stall varies both with compressor inlet temperature and compressor inlet pressure. It becomes necessary, therefore, to provide two limits to the value of fuel flow per p.s.i. compressor discharge pressure that is metered during acceleration; one based on a structural temperature limit and varied only with compressor inlet temperature, and the other based on compressor stall temperature limit and varied by speed, inlet temperature and inlet pressure.

Certain fuel controls for the more advanced and powerful gas turbine power plants used in military aircraft have biased the set power plant speed by compressor inlet temperature to maintain a fixed steady state turbine inlet temperature for military rated power. It has been determined that better accuracy can be obtained by biasing the selection of speed with compressor inlet pressure.

An object of this invention, therefore, is to provide a fuel control for gas turbine power plants that gives more accurate overall control of fuel flow to the power plant.

Another object of the invention is to provide a gas turbine power plant fuel control that compensates for the effect of Reynolds number on the compressor surge characteristics.

Still another object of the invention is to provide a gas turbine power plant fuel control that maintains a fixed steady state turbine inlet temperature for a particular power setting.

Other objects and advantages will be apparent from the specification and claims and from the accompanying drawing which illustrates an embodiment of the invention.

In the drawing:

The single figure shows in schematic form a fuel control in accordance with this invention combined with a gas turbine power plant.

Referring to the drawing in detail, gas turbine power plant 10 includes inlet 12, compressor 14, combustion section 16 including a plurality of burners 18, turbine 20 and exhaust nozzle 22, in succession in the direction of airflow through the power plant. Compressor 14 is connected to and driven by turbine 20 through shaft 24, the turbine receiving its energy from a mixture of fuel and air burned in burners 18. The compressor may be split with one group of compressor stages being driven by one or more turbine stages and the remaining compressor stages being driven by one or more remaining turbine stages. As shown, each stage of turbine 20 drives a separate group of compressor stages, such structure being well known in the art.

Fuel is fed to the power plant by power plant driven pump 26 from a source not shown. The fuel is pumped through conduit 28 to fuel control 30 having metering valve 32 therein which controls the flow of fuel to the power plant in accordance with power plant requirements. Fuel in conduit 28 enters annular chamber 34 in the control and then passes through one or more ports 36 in fixed liner 38 and then through one or more ports 40 in movable cylinder 42 to chamber 44 within the cylinder. A pair of rectangular ports 46 and 48 meter fuel flow to the power plant, port 46 being in cylinder 42 and port 48 being in liner 38. Relative rotational and translational movement of port 46 with respect to port 48 varies the metering area and thus controls fuel flow from chamber 44 to annulus 50 and conduit 52 which is connected to manifold 54 surrounding the power plant. Fuel is distributed from manifold 54 to each burner through nozzles 56, only one of which is shown.

In order to control fuel flow to the power plant directly as the effective area of metering ports 46 and 48, the pressure drop across metering valve 32 is held constant. Chamber 58 has piston 60 therein and passage 62 connects one end of the chamber to inlet conduit 28 to subject one side of the piston to metering valve inlet pressure, and passage 64 connects the opposite end of the chamber to annulus 50 and discharge conduit 52 to subject the other end of the piston to metering valve outlet pressure. Spring 66 assists the pressure from passage 64 acting on piston 60 to control the pressure drop across the metering valve by regulating the amount of fuel bypassed from conduit 28 through passage 68 to the inlet of pump 26.

The area of the metering ports in valve 32 is varied through translational and rotational movement of cylinder 42. Translational movement of the cylinder is related to the speed of compressor 14 in power plant 10. Gear 70 on shaft 24 drives gear shaft 72 which is connected to plate 74 on which governor flyweights 76 are mounted. The flyweights engage abutment 78 on spindle 80 of cylinder 42 and movement of the flyweights as a function of compressor speed results in translational movement of the cylinder to vary the effective area of metering ports 46 and 48.

The power plant operator controls the power plant by regulating the datum of the governor flyweights through throttle 82 which is connected to shaft 84 on which is mounted three-dimensional cam 86. Follower 88 on lever 90 is in contact with the surface of cam 86 and movement of throttle 82 results in translational movement of cam 86 and rotational movement of lever 90 about fixed pivot 92 to adjust the loading on speeder spring 94 and establish the datum for the flyweights.

The selection of speed is biased with compressor inlet pressure by rotating cam 86 through a servo motor which varies the throttle established loading on spring 94. Static pressure station 96 is located in power plant 10 adjacent to the inlet of compressor 14 and is connected by line 98 to chamber 110 in which is mounted evacuated bellows 112. One end of the bellows is fixed to one wall of the chamber and the opposite end, which is free to move, has mounted thereon stem 114 which is connected to lever 116. Expansion and contraction of the bellows in response to variations in compressor inlet pressure rotates lever 116 about fixed pivot 118 to move cap 120 on the lever toward or away from port 122 to vary the area of the port for a purpose to be explained below.

Arm 124 extends from lever 116 and terminates in abutment 126 which engages spring 128 interposed between the abutment and piston 130 in bore 132. An extension 134 on the piston has rack 136 thereon which engages with pinion 138 on shaft 84 and rotation of the shaft and cam 86 occurs upon movement of the piston. Coupling 140 permits rotation of the shaft and the cam with respect to throttle 82 and its associated linkage. Fluid from a source such as conduit 28 is supplied through passage 142 having restriction 144 therein to chamber 146 formed by piston 130 and bore 132. A passage 148 leads from the chamber to port 122, the area of which is determined by the position of cap 120 which, as explained above, is a function of compressor inlet pressure. As is readily apparent, when cap 120 decreases the area of port 122 due to a change in compressor inlet pressure the fluid pressure in chamber 146 increases and piston 130 moves upward to rotate cam 86. Movement of cap 120 away from port 122 results in a lowering of the fluid pressure in chamber 146 and downward movement of piston 130 to rotate cam 86 in the opposite direction. Thus, by rotating cam 86 the speed selection can be biased and, through proper contouring of the cam, the bias can be limited to certain predetermined speed and power ranges of the power plant.

Rotational movement of metering valve cylinder 42 is related to compressor discharge pressure. Static pressure station 150 is located in power plant 10 adjacent to the discharge end of compressor 14 and is connected by line 152 to chamber 154 in which is mounted evacuated bellows 156. Expansion and contraction of the bellows varies, through lever 158, the area of port 160 which is part of a servo motor similar to that described above for rotating cam 86 as a function of compressor inlet pressure. The servo motor rotates cylinder 42 through rack 162 and pinion 164 on cylinder spindle 166 to vary the area of metering ports 46 and 48 as a function of compressor discharge pressure.

Throttle 82 establishes the steady state operating conditions for the power plant. Any tendency of the power plant to deviate from an equilibrium condition, as by overspeeding, results in upward movement of metering valve cylinder 42 to reduce the effective area of metering ports 46 and 48. This reduces fuel flow to the power plant, reducing power plant speed and restoring the equilibrium condition. Any tendency of the power plant speed to drop off causes an increase in port area and eventual restoration of the equilibrium condition. Stops 168 and 170 provide an acceleration limit for the power plant and limit movement of cylinder 42 in an increase-flow direction to protect the power plant against over-temperature and against compressor stall. One or the other of these stops is engaged by abutment 172 on spindle 166.

Stop 168 is the compressor stall temperature limiter and its position is determined as a combined function of compressor speed, compressor inlet temperature and compressor inlet pressure. Temperature bulb 174 is mounted adjacent to the inlet of compressor 14 and is connected to temperature responsive bellows 176. The free end of the bellows is connected to shaft 178 on which is mounted three-dimensional cam 180; expansion and contraction of the bellows with variations in compressor inlet temperature translating the cam.

Cam 180 is rotated as a function of compressor speed. Power plant driven shaft 72 is connected by shaft 182 to plate 184 on which governor flyweights 186 are mounted. The flyweights engage abutment 188 on link 190 which is connected to lever 192. The lever rotates about fixed pivot 194 in response to changes in compressor speed to vary the area of port 196 which is part of a servo motor similar to that described above for rotating cam 86. The servo motor rotates shaft 178 and cam 180 through rack 198 and pinion 210.

Follower 212 on lever 214 is in contact with the surface of cam 180 and rotational and translational movement of the cam rotates the lever about pivot 216 to translate shaft 218 and three-dimensional cam 220 mounted thereon. This cam, which is translated as a function of compressor inlet temperature and compressor speed, is rotated as a function of compressor inlet pressure. Static pressure station 96 is connected by lines 98 and 222 to chamber 224 in which evacuated bellows 226 is mounted. This bellows acts through a servo motor similar to that described above for rotating cam 86 to rotate cam 220. Follower 228 is in contact with the surface of cam 220 and is on lever 230 on which stop 168 also is located. Translation of cam 220 as a function of compressor inlet temperature and compressor speed, or rotation of the cam as a function of compressor inlet pressure rotates lever 230 about pivot 232 to position stop 168 and limit the maximum opening of metering valve 32.

Stop 170 is the structural temperature limiter and is positioned as a function of compressor inlet temperature. Link 234 is connected at one end to shaft 178 which is connected to compressor inlet temperature responsive bellows 176. The link is connected at its opposite end to bell crank 236 on which stop 170 also is located. Translation of shaft 178 and link 234 with changes in compressor inlet temperature rotates crank 236 about pivot 238 to position stop 170 and also limit the maximum opening of metering valve 32.

A preload may be applied to any of the servo motors to assure a relatively large spring force for overcoming friction and inertia and assuring more efficient operation of the servo motor. Such a spring preload is shown in connection with the compressor inlet pressure responsive servo motor for rotating cam 86. At very low compressor inlet pressures the difference between the pressure in chamber 110 and that within evacuated bellows 112 is slight and the force for rotating lever 116 is very small. Preload spring 240, interposed between the lever and fixed surface 242, adds to this force and tends to close cap 120 on port 122. This increases the pressure in chamber 146 and when equilibrium in the servo motor is restored the loading on spring 128 is substantially greater than it would be in the absence of preload spring 240. This assures a relative large force under all conditions for moving piston 130 and rotating cam 86.

It is to be understood that the invention is not limited to the specific embodiment herein illustrated and described but may be used in other ways without departure from its spirit as defined by the following claims.

I claim:

1. For a gas turbine power plant having a compressor and fuel supply means including a conduit, valve means in said conduit for regulating fuel flow to said power plant, means for controlling said valve means as a function of compressor speed, compressor inlet pressure and compressor discharge pressure, first acceleration limit means positioned as a function of compressor inlet temperature for limiting the opening of said valve means in accordance with said function, and second acceleration limit means, independent of said first acceleration limit means, positioned as a function of compressor inlet temperature, compressor speed and compressor inlet pressure for limiting the opening of said valve means in accordance with said last-mentioned function.

2. For a gas turbine power plant having a compressor and fuel supply means including a conduit, valve means in said conduit for regulating fuel flow to said power plant, means for controlling said valve means as a function of compressor speed and compressor discharge pressure, means connected to said valve means for scheduling fuel flow to maintain selected compressor speeds throughout the range of operation of said compressor, and means for biasing the selection as a function of compressor inlet pressure.

3. For a gas turbine power plant having a compressor and fuel supply means including a conduit, valve means in said conduit for regulating fuel flow to said power plant, means for controlling said valve means as a function of compressor speed and compressor discharge pressure, means, connected to said valve means for scheduling fuel flow to maintain selected compressor speeds throughout the range of operation of said compressor speed, means for biasing the selection as a function of compressor inlet pressure, and acceleration limit means for controlling said valve means as a function of compressor inlet temperature, compressor speed and compressor inlet pressure.

4. In a fuel system for a gas turbine power plant, valve means for regulating fuel flow to said power plant, said valve means including metering elements capable of rotational and translational movement with respect to each other, means for translating one of said elements as a function of power plant speed and a power plant pressure, means for rotating one of said elements as a function of a power plant pressure, and means for limiting translational movement of said translatable element as a function of power plant speed, a power plant temperature and a power plant pressure.

5. In a fuel system for a gas turbine power plant having a compressor, valve means for regulating fuel flow to said power plant, said valve means including metering elements capable of rotational and translational movement with respect to each other, means for translating one of said elements as a function of compressor speed, means for rotating one of said elements, means for setting compressor speed, means for biasing the selection of speed as a function of a compressor pressure, and means for limiting translational movement of said translatable element as a function of compressor speed and compressor inlet pressure and temperature.

6. In a fuel system for a gas turbine power plant having a compressor, valve means for regulating fuel flow to said power plant, said valve means including metering elements capable of rotational and translational movement with respect to each other, means for translating one of said elements as a function of compressor speed, means for rotating one of said elements as a function of a compressor pressure, first means for limiting translational movement of one said translatable element as a function of a compressor temperature, and second means for limiting translational movement of said translatable element as a function of compressor speed and compressor inlet pressure and temperature.

7. A fuel control for a gas turbine power plant having a compressor, said fuel control having variable area metering means controlling fuel flow to said power plant, means responsive to compressor speed and a pressure adjacent the compressor discharge for varying metering means area, means responsive to compressor inlet speed and a temperature adjacent the compressor inlet for producing a signal, first means positioned in response to said signal and in response to a pressure adjacent the compressor inlet for limiting the maximum area of said metering means in accordance with said speed, said temperature, and said pressure, and second means, independent of said first limiting means, positioned in response to said temperature for limiting the maximum area of said metering means in accordance with said temperature.

8. A fuel control for a gas turbine power plant having a compressor, said fuel control having variable area metering means controlling fuel flow to said power plant, means responsive to compressor speed and a pressure adjacent the compressor discharge for varying metering means area, three-dimension cam means moved in one direction by compressor speed and another direction by a temperature adjacent the compressor inlet for producing a signal, three-dimension cam means moved in one direction by said signal and another direction by a pressure adjacent the compressor inlet for limiting the maximum area of said metering means, and means responsive to said temperature for limiting the maximum area of said metering means.

9. A fuel control for a gas turbine power plant having a compressor, said fuel control having variable area metering means controlling fuel flow to said power plant, means responsive to compressor speed and a pressure adjacent the compressor discharge for varying metering means valve area, means operatively connected with said metering means for selecting compressor speed, means for biasing said speed selecting means as a function of a pressure adjacent the compressor inlet, means responsive to compressor speed and a temperature adjacent the compressor inlet for producing a signal and means responsive to said signal and a pressure adjacent the compressor inlet for limiting the maximum area of said metering means.

10. A fuel control for a gas turbine power plant having a compressor, said fuel control having variable area metering means controlling fuel flow to said power plant, means responsive to compressor speed and a pressure adjacent the compressor discharge for varying metering means area, means operatively connected with said metering means for selecting compressor speed, means for biasing selected speed as a function of a pressure adjacent the compressor inlet, three-dimension cam means moved in one direction by compressor speed and another direction by a temperature adjacent the compressor inlet for producing a signal and three-dimension cam means moved in one direction by said signal and another direction by a pressure adjacent the compressor inlet for limiting the maximum area of said metering means.

11. A fuel control for a gas turbine power plant having a compressor, said fuel control having metering means controlling fuel flow to said power plant, means responsive to compressor speed and a pressure adjacent the compressor discharge for varying metering means area, means operatively connected with said metering means for selecting compressor speed, means for biasing selected speed as a function of a pressure adjacent the compressor inlet, three-dimension cam means moved in one direction by compressor speed and another direction by a temperature adjacent the compressor inlet for producing a signal, three-dimension cam means moved in one direction by said signal and another direction by a pressure adjacent the compressor inlet for limiting the maximum area of said metering means, and means responsive to said temperature for limiting the maximum area of said metering means.

12. For a gas turbine power plant having a compressor and fuel supply means including a conduit, valve means in said conduit for regulating fuel flow to said power plant, means for controlling said valve means in proportion to compressor speed and compressor discharge pressure, means connected to said valve means for scheduling fuel flow to maintain selected compressor speeds throughout the range of operation of said compressor, and means for biasing the speed selection as a function of compressor inlet pressure.

References Cited in the file of this patent
UNITED STATES PATENTS

| | | |
|---|---|---|
| 2,422,808 | Stokes | June 24, 1947 |
| 2,668,416 | Lee | Feb. 9, 1954 |
| 2,670,599 | Davies et al. | Mar. 2, 1954 |
| 2,691,268 | Prentiss | Oct. 12, 1954 |
| 2,720,751 | Kunz | Oct. 18, 1955 |
| 2,720,752 | Chandler | Oct. 18, 1955 |
| 2,779,422 | Dolza et al. | Jan. 29, 1957 |
| 2,822,666 | Best | Feb. 11, 1958 |
| 2,857,739 | Wright | Oct. 28, 1958 |
| 2,880,580 | Wallace | Apr. 7, 1959 |
| 3,032,986 | Wright | May 8, 1962 |

UNITED STATES PATENT OFFICE
CERTIFICATE OF CORRECTION

Patent No. 3,139,727

July 7, 1964

Bruce N. Torell

It is hereby certified that error appears in the above numbered patent requiring correction and that the said Letters Patent should read as corrected below.

Column 4, lines 64 and 74, before "selection", each occurrence, insert -- speed --; column 5, line 34, strike out "one"; column 6, line 5, strike out "valve".

Signed and sealed this 15th day of December 1964.

(SEAL)
Attest:

ERNEST W. SWIDER
Attesting Officer

EDWARD J. BRENNER
Commissioner of Patents